(12) United States Patent
Bethanabhotla et al.

(10) Patent No.: US 11,851,049 B1
(45) Date of Patent: Dec. 26, 2023

(54) SYSTEM TO DETECT IMPACTS

(71) Applicant: Zoox, Inc., Foster City, CA (US)

(72) Inventors: Dilip Bethanabhotla, Freemont, CA (US); Michael Carsten Bosse, Cupertino, CA (US); Venkata Subrahmanyam Chandra Sekhar Chebiyyam, San Francisco, CA (US); Nam Gook Cho, Cupertino, CA (US); Jonathan Tyler Dowdall, San Francisco, CA (US); Amanda Brown Prescott, Half Moon Bay, CA (US); Subasingha Shaminda Subasingha, San Ramon, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 193 days.

(21) Appl. No.: 16/805,250

(22) Filed: Feb. 28, 2020

(51) Int. Cl.
  *B60W 30/09* (2012.01)
  *H04R 1/08* (2006.01)
  *G10L 25/51* (2013.01)
  *G05D 1/00* (2006.01)
  *B60W 60/00* (2020.01)

(52) U.S. Cl.
  CPC ........ *B60W 30/09* (2013.01); *B60W 60/0015* (2020.02); *G05D 1/0088* (2013.01); *G10L 25/51* (2013.01); *H04R 1/08* (2013.01); *B60W 2420/54* (2013.01); *B60W 2520/10* (2013.01); *B60W 2554/4042* (2020.02); *B60W 2756/10* (2020.02); *H04R 2499/13* (2013.01)

(58) Field of Classification Search
  CPC ............. B60W 30/09; B60W 60/0015; B60W 2554/4042; B60W 2756/10; B60W 2420/54; B60W 2520/10; G05D 1/0088; G10L 25/51; H04R 1/08; H04R 2499/13
  See application file for complete search history.

(56) References Cited

U.S. PATENT DOCUMENTS 9,233,667 B2 *  1/2016  Lee ........................... B60T 7/22
2017/0096138 A1 *  4/2017  Reiff .................... G05D 1/0255
2017/0222612 A1 *  8/2017  Zollner .................... H04R 3/12
(Continued)

OTHER PUBLICATIONS

Packet et al., U.S. Appl. No. 16/136,038 entitled "Collision Prediction and Avoidance for Vehicles," filed Sep. 19, 2018; 73 pages.
(Continued)

*Primary Examiner* — Mahmoud S Ismail
*Assistant Examiner* — Gabriel Anfinrud
(74) *Attorney, Agent, or Firm* — Lee & Hayes, P.C.

(57) ABSTRACT

Techniques for utilizing microphone or audio data to detect and responding to low velocity impacts to a system such as an autonomous vehicle. In some cases, the system may be equipped with a plurality of microphones that may be used to detect impacts that fail to register on the data captured by the vehicle's inertial measurement units and may go undetected by the vehicle's perception system and sensors. In one specific example, the perception system of the autonomous vehicle may identify a period of time in which a potential low velocity impact may occur. The autonomous vehicle may then utilize the microphone or audio data associated with the period of time to determine if an impact occurred.

20 Claims, 7 Drawing Sheets

(56) References Cited

U.S. PATENT DOCUMENTS

| | | | |
|---|---|---|---|
| 2018/0075309 A1* | 3/2018 | Sathyanarayana | G05D 1/0055 |
| 2018/0141544 A1* | 5/2018 | Xiao | G05D 1/0212 |
| 2019/0384309 A1 | 12/2019 | Silva et al. | |
| 2020/0031337 A1* | 1/2020 | Soltanian | G06V 20/58 |
| 2020/0070816 A1* | 3/2020 | O'Donnell | H04R 1/326 |
| 2020/0139990 A1* | 5/2020 | Hiruma | B60W 50/0205 |
| 2020/0408623 A1* | 12/2020 | Kim | G01L 5/164 |
| 2021/0039639 A1* | 2/2021 | Song | G01C 21/3415 |

OTHER PUBLICATIONS

Evans et al., U.S. Appl. No. 16/235,862 entitled, "Tracking Objects Using Sensor Data Segmentations and/or Representations," filed Dec. 28, 2018; 57 pages.

Goel et al., U.S. Appl. No. 16/238,475 entitled "Hierarchical Machine-Learning Network Architecture," filed Jan. 2, 2019; 59 pages.

Goel et al., U.S. Appl. No. 16/732,243 entitled "Multi-Task Learning for Real-Time Semantic and/or Depth Aware Instance Segmentation and/or Three-Dimensional Object Bounding," filed Dec. 31, 2019; 73 pages.

Das et al., U.S. Appl. No. 16/779,576 entitled, "Improved Object Detection and Tracking," filed Jan. 31, 2020; 73 pages.

* cited by examiner

SYSTEM TO DETECT IMPACTS

BACKGROUND

Vision sensors used on systems (such as autonomous vehicles) may detect objects as they approach the system, but may not be able to distinguish between an impact and a near miss. Additionally, low velocity impacts, glancing impacts, and/or impacts with soft objects may not register on motion sensors of the system or may be indistinguishable from the vibrations caused by normal operation of the system (such as the vehicle driving). Thus, in some situations, such systems may be unaware of some impacts. However, it may nevertheless be important to know whether or not an impact occurred to ensure the safe operation of the system and objects in the environment, and to comply with laws, such as those that require the exchange of vehicle information and/or contacting local law enforcement in the event of an impact with a vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
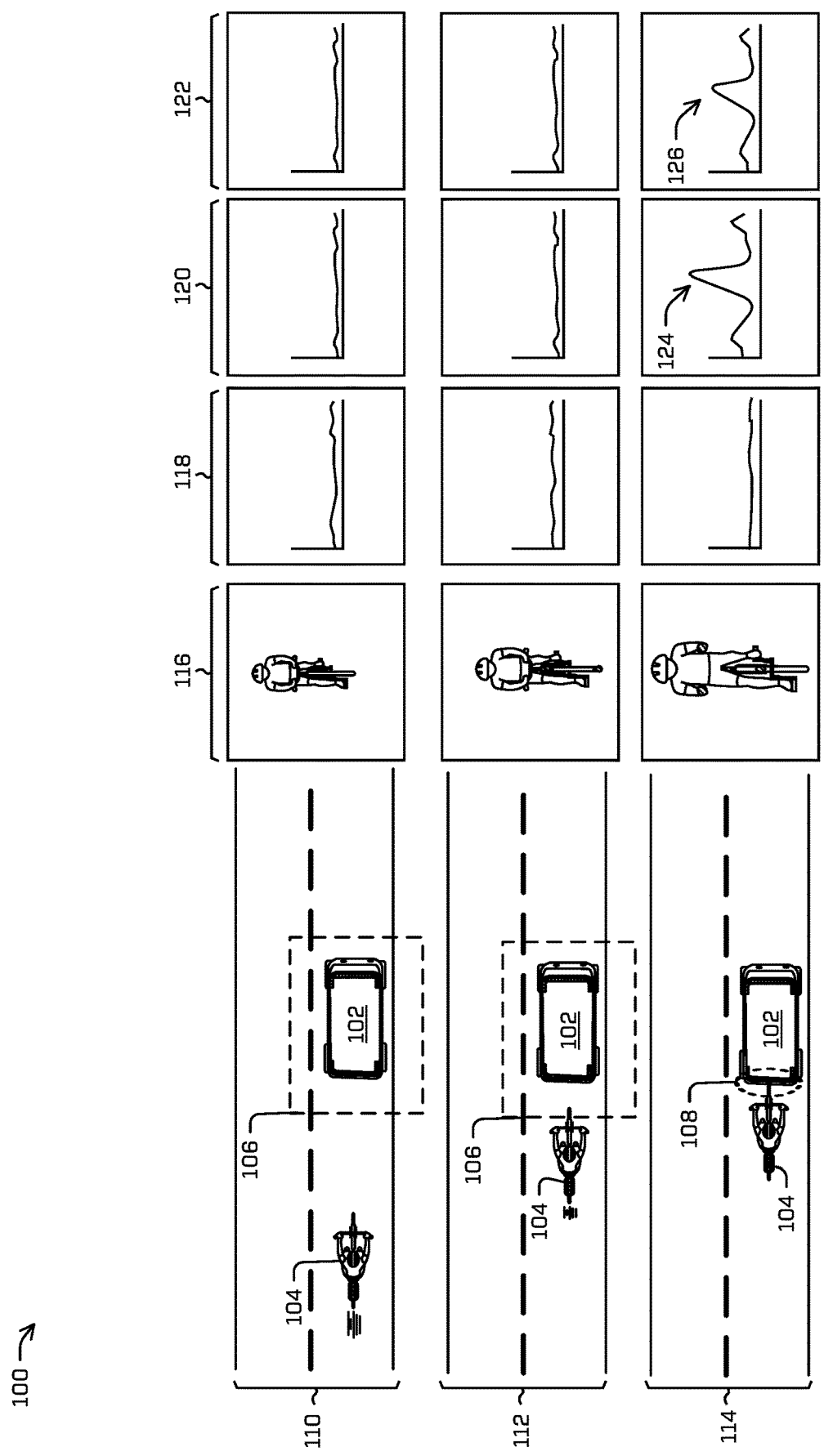
FIG. 1 is an example pictorial diagram illustrating an example situation in which a low velocity or momentum impact may not be detected by a perception system of an autonomous vehicle, as described herein.

Techniques described herein are directed to an impact detection system that can be used, for example, on an autonomous vehicle that utilizes data captured by one or more microphones to detect impacts. In general, various systems such as autonomous vehicles often use perception (image, radar, lidar, etc.) sensors and motion sensors (e.g., an inertial measurement unit, etc.) together with a perception system processing various types of data collected by the sensors to identify objects, predicted trajectories of those objects, and determine if collisions or impacts occurred or are likely to occur. However, even with multiple redundant radar, lidar, and image sensors positioned at various locations around the vehicle exterior, the sensor system may in close proximity to (e.g., within a threshold distance of) the exterior surface of the vehicle experience difficulty in distinguishing between an impact and a near miss. Additionally, objects in the environment impacting the vehicle at low velocities (e.g., less than 5 miles per hour, less than 10 miles per hour, less than 15 miles per hours, etc.) or slight glancing impacts may not be detected by the motion sensors (e.g., inertial measurement units (IMUs), accelerometers, magnetometers, gyroscopes, etc.) of the vehicle.

In some examples, the impact detection system, described herein, may utilize one or more microphones positioned adjacent to the exterior surface of the vehicle as impact detection sensors. In one implementation, the system may determine a potential of a low velocity or momentum impact occurring is equal to or greater than a threshold risk based at least in part on processing the vision data, such as radar, lidar, and image data. For example, if the autonomous vehicle is parked and the perception system outputs an incoming bicyclist approaching the vehicle at a momentum that may result in the bicyclist impacting or colliding with the vehicle at an area in which distinguishing between an impact and a near miss is difficult, the impact detection system may determine a window of time (e.g., a period of 1.0 millisecond, 10 milliseconds, 15 milliseconds, 30 milliseconds, . . . 1.0 second, etc.) in which the bicyclist may impact the vehicle. The impact detection system may process the audio data captured by the microphones to determine if a spike or increase in activity (e.g., a noise) occurred during the window of time associated with the potential impact. For example, microphones may register an increase in activity when the exterior of the vehicle is impacted by the bicyclist, as the microphones may detect the impact via vibrations conducted through the body of the vehicle and/or sounds conducted through the air.

In some cases, the vehicle may also determine a location or position with respect to the vehicle and associated with the impact. For example, the location or position may be determined based on various localization techniques associated with microphone arrays or using time-based triangulation between the increase in activity between the various microphones positioned about the vehicle. In some examples, models associated determine location of an impact based on vibrations conducted via the chassis, frame, or body of the vehicle (e.g., the models may represent different impact locations and corresponding detections by the microphones). In some cases, the body vibration models may be used in conjunction with similar models associated with air conduction (e.g., sound or noise detection by the microphones). For instance, an impact in rear of the vehicle may detected as both sound and body vibrations by the rear and side microphones but as only body vibrations by the front microphones. In some cases, the location may be further triangulated with respect to the vehicle based on differences in the speed of detection by the microphones as the vibrations may propagate through the body of the vehicle at a faster rate than sound through the air. In other cases, the location may be relative such as a determination of a closest microphone based on an amplitude of the increase in activity (e.g., the nearest microphone experiences the highest amplitude). As a non-limiting example, for an low level impact with the vehicle, a microphone closest to the source of the impact may record audio having an amplitude higher than that of any other microphone on a portion of the vehicle further from the impact, though having a peak(s) which occurs at approximately the same time. In a similar example, a loud sound proximate the vehicle may be differentiated from an impact as, despite having dissimilar amplitudes, the amplitudes may have a measurable difference in time between the amplitudes based on the different media through which the sound is travelling.

In some cases, the system may also apply one or more classifiers to the captured audio data that may be used to determine if the spike in activity is associated with an impact. For example, such a classifier may be able to distinguish an individual slamming a door in a similar manner as a "thud" sound of the bicycle impacting the exterior of the vehicle, even where both sounds happen during the same window of time. Thus, the classifiers may be trained using various training data, models, networks, or other machine learned processes, such as utilized neural networks, deep neural networks, convolutional neural networks, regression techniques, etc. to classify the captured audio data as an impact and/or as other noises in the physical environment.

In some examples, the system may also utilize one or more classifiers associated with the perception data to determine a type of object that is predicted to possibly impact the vehicle. In this example, the system may also utilize the object classification to assist in determining a type of sound that is expected to be detected in the result of an impact by the object. In one specific case, the classification of the object may be used to exclude or remove increases in microphone activity that may be within the window of time but associated with a different class of objects (e.g., a door slamming versus a bird impacting as window of the vehicle).

In situations in which a low momentum impact is detected, the vehicle may take one or more actions. For instance, the vehicle may pull over or stop and alert, notify, or contact a remote operator to assist with the exchange of information with another party. The vehicle may additionally or alternatively output an audible or visual signal or message to nearby people or objects in the environment. In some cases, the vehicle may also contact local law enforcement or other first responder. In some cases, the vehicle may also enable driving or configuring a new route to, for instance, a location at which the vehicle may be inspected for damage and/or repaired. In some instances, the action the vehicle takes may also be based on governing laws for vehicles operating in the current location.

The system may also be configured to utilize other sensors, such as the IMUs, radar, lidar, and image sensors, to validate potential low momentum impacts and/or remove false positives. For example, if the classifiers identify activity within the microphones as a potential low momentum impact, the perception or vision sensors (e.g., lidar, radar, or image sensors) may be analyzed or processed to determine any other possible sources of the activity. For example, if the perception system identifies an individual shutting or slamming a door in close proximity to the vehicle at a time the substantially corresponds to the spike in activity in the microphones, then the system may flag the activity as a false positive and proceed with normal operations.

In one specific example, the classifiers may be trained to analyze multiple types of sensor data when detecting the low momentum impact or collision. For example, the classifiers may be trained on combinations of data from the microphones, IMUs, lidar sensors, radar sensors, and/or image sensors to more accurately detect the low momentum impacts. Again, the classifiers may be trained on data associated with various machine learned models and/or networks.

FIG. 1 is an example pictorial diagram 100 illustrating an example situation in which a low momentum impact may not be detected by a perception system of an autonomous vehicle 102, as described herein. For example, the vehicle 102 may be stopped and a bicyclist 104 may be approaching the vehicle 102 at a low momentum (such as less than 1.0 miles per hour). The perception system of the vehicle 102 may utilize perception data 116 to track the bicyclist 104 as the bicyclist 104 nears the vehicle 102 as shown. However, if at a distance 106 from the vehicle 102, the bicycle 104 is moving at a momentum in which a low momentum impact is possible, the image, radar, and lidar sensors of the vehicle 102 may be unable to capture the impact. Additionally, the impact 108 may be too soft or light to register on the IMU or other motion sensor data, illustrated as data 118, of the vehicle 102.

Thus, in this example, at a first time 110, the vehicle 102 may originally monitor the bicyclist 104 via the perception system using the perception data 116. At a second time 112, the vehicle 102 may determine that the bicyclist 104 has crossed the distance threshold 106 and that the bicyclist 104 is still moving at a momentum in which a potential impact with the rear of the vehicle 102 is possible. For instance, the vehicle 102 may determine the potential of the impact 108 at time 112 by processing the perception data 116 collected by the perception sensors (e.g., radar, lidar, and image sensors) as part of an object tracking and prediction pipeline. Upon determining that a potential impact 108 is possible, the vehicle 102 may generate a window or time associated with the potential impact 108. At time 114, the vehicle 102 may monitor or analyze audio data 120 and 122 captured, respectively, by a first microphone and second microphone to determine if the bicyclist 104 did in fact impact 108 the vehicle 102. Thus, the window of time may include the time 114. For example, an increase in activity, generally illustrated as 124, for the audio data 120 and, as 126, for the audio data 122. In this example, the increases in activity 124 and 126 indicate of the impact 108 occurred. In this example, as the bicyclist 104 did impact 108 the vehicle 102, the vehicle 102 may provide vehicle information and/or notify to a remote operator.

In one example, the vehicle 102 may determine using the perception data a likelihood of an impact. For instance, the vehicle 102 may determine likelihood of an impact based at least in part on a momentum of the bicyclist 104, a momentum of the vehicle 102, an acceleration of the bicyclist 104, an acceleration of the vehicle 102, a velocity of the bicyclist 104, a velocity of the vehicle 102, a distance between the vehicle 102 and the object, among other factors. The vehicle 102 may then define a window of time or analyze the audio data 120 and 122 based at least in part on the likelihood exceeding or meeting a likelihood threshold. In some particular examples, the actions taken in response to the potential impact by the vehicle 102 may be based in part on the likelihood of the impact and/or a determination of an extent of damage caused by the potential impact.

It should be understood that, in some cases, the distance 106 may be very close (e.g., less than 5 inches, less than 1 inch, etc.) from the vehicle 102. Further, while in FIG. 1 the distance 106 is shown as approximately uniform around the vehicle 102, it should be understood, that the distance 106 may vary in relation to the vehicle 102 and the placement of the various perception system sensors. Thus, at some locations along the exterior of the vehicle 102, the distance 106 may be closer to the vehicle 102 than in other locations along the exterior of the vehicle 102.

FIGS. 2-5 are flow diagrams illustrating example processes associated with the detecting low momentum impacts according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 2:
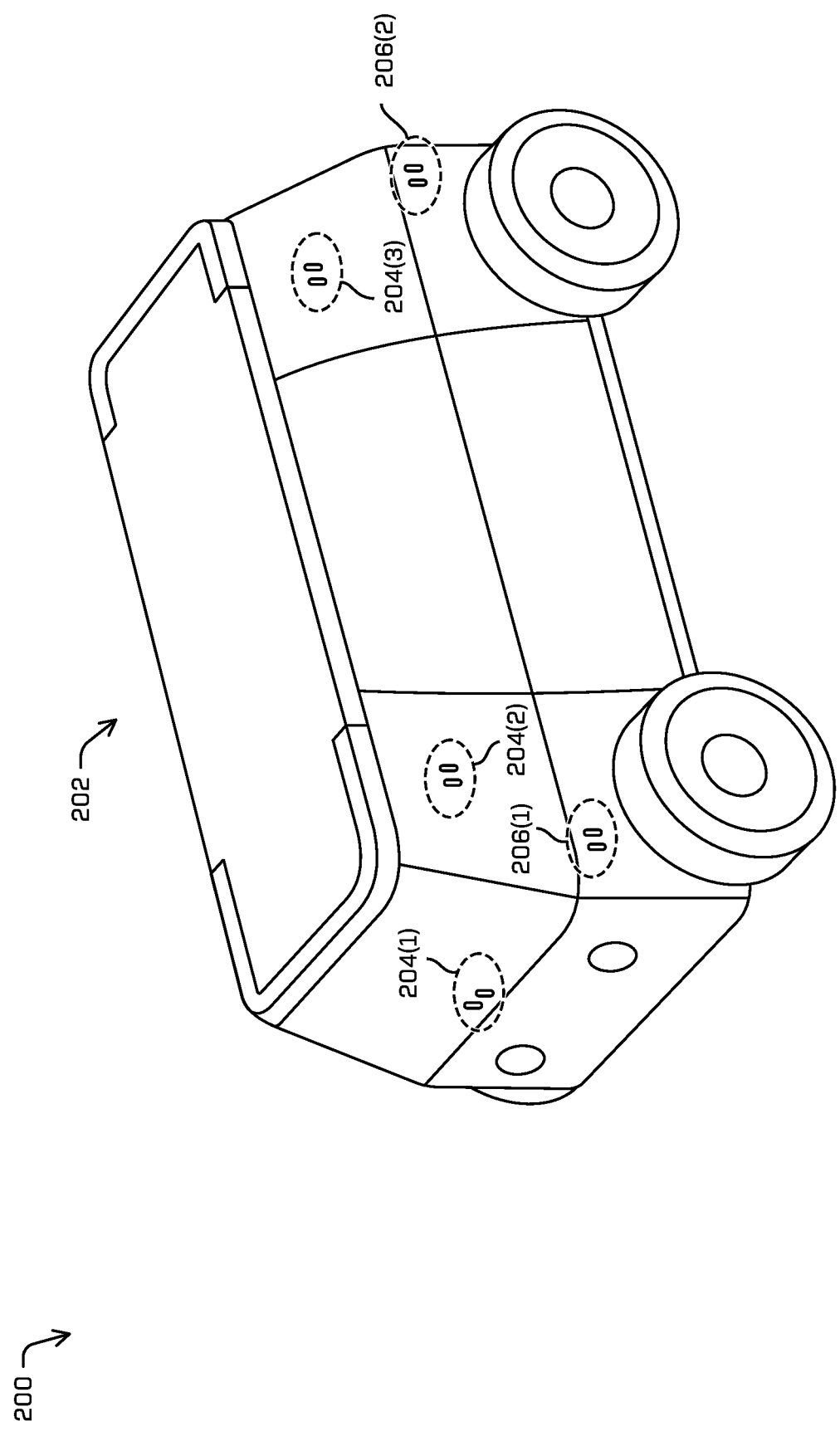
FIG. 2 is a pictorial diagram illustrating an example autonomous vehicle having microphones arranged along exterior surfaces to detect low velocity impacts, as described herein.

FIG. 2 is a pictorial diagram 200 illustrating an example autonomous vehicle 202 having microphones 204 arranged along exterior surfaces to detect low momentum impacts, as described herein. In the illustrated example, pairs of microphones 204 that may be used to detect increased activity, such as vibrations propagated through the body of the vehicle 202 or sounds associated with an impact propagated through the air. It should be understood, that in other examples, individual microphones as well as arrays of three or more microphones may be used in lieu of or in addition to the pairs of microphones 204. Additionally, while in the current example three pairs of microphones 204 are shown, any number of placement of microphones may be used along the exterior surface of the vehicle 202.

In the current example, the vehicle may also include a number of motion sensors (e.g., IMUs) 206. In the current example, the motion sensors are located in proximity to wheels of the vehicle 202 but it should be understood that any number of placement of motion sensors 206 may be used along the exterior and/or interior of the vehicle 202. For instance, in some cases, data collected by the pairs of microphones 204 (or between pairs of microphones 204) and/or the motion sensors 206 may be used to position or locate an area associated with a potential low momentum impact. In one example, once a general area of potential impact is determined, the vehicle 202 may process or review image data, lidar data, radar data, motion data, microphone or audio data, and other sensor data to verify that an impact occurred prior to contacting a remote operator or other third-party system (e.g., law enforcement). In this manner, in addition to the time stamps used to correlate the sensor data or create a window of time, the area of the impact may be used to reduce the overall amount of sensor data to review when confirming a low momentum impact.

Figure 3:
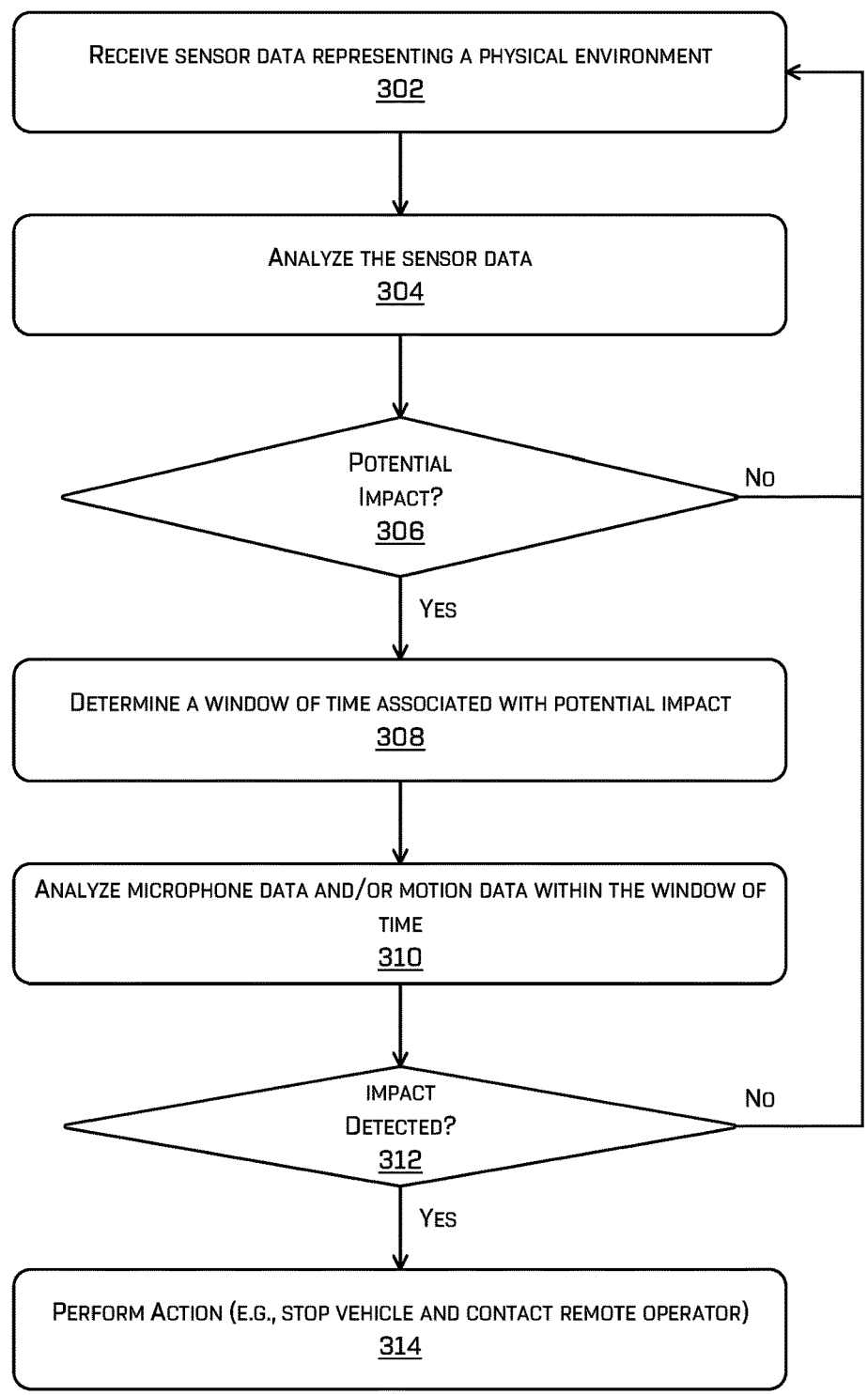
FIG. 3 is a flow diagram illustrating an example process for detecting low momentum impacts, as described herein.

FIG. 3 is a flow diagram illustrating an example process 300 for detecting low momentum impacts, as described herein. As discussed above, autonomous vehicles often use an perception and motion sensors together with a perception system processing various types of data collected by the sensors to identify objects, predicted trajectories of those objects, and determine if collisions or impacts occurred. However, the vehicle's perception system may include areas in close proximity to (e.g., within a threshold distance of) the exterior surface of the vehicle in which it may be difficult to distinguishing between an impact and a near miss and/or detect low momentum impact. Additionally, as discussed above, impacts caused by objects traveling at low velocities (e.g., less than 5 miles per hour, less than 10 miles per hour, less than 15 miles per hours, etc.) may fail to register as activity by the motion sensors of the vehicle. Thus, in some cases, one or more microphones positioned adjacent to the exterior surface of the vehicle may be used both to capture audio data, such as to conduct a conversation, and also as impact detection sensors.

At 302, the vehicle may receive sensor data representing a physical environment. For example, a perception system of the vehicle may receive image data, lidar data, and/or radar data of the physical environment from one or more sensors.

At 304, the perception system may analyze the sensor data. For instance, the perception system may perform classification, segmentation, and/or otherwise process the image data, lidar data, and/or radar data to identify an object, such as the bicyclist of FIG. 1, within the environment surrounding the vehicle. In some cases, the perception system may perform object segmentation, feature extraction, sparse features representation, pattern detection, white space detection, pixel correlation, feature mapping, etc. and utilize one or more neural networks, deep learning, and/or regression techniques to detect, classify, and predict a motion path of the object. For example, details of classification and/or segmentation are discussed in U.S. application Ser. Nos. 16/238,475 and 16/732,243, which are herein incorporated by reference, in their entirety.

At 306, the perception system may determine if a potential impact is possible. For example, the perception system may predict a likelihood or probability that the object may impact the vehicle based on the vehicle's position, the vehicle's heading, the vehicle's momentum, the object's positions, the object's trajectory, and the object's momentum. For example, details of predicting potential impacts are discussed in U.S. application Ser. No. 16/136,038, which is herein incorporated by reference, in its entirety. In some cases, the perception system may determine if the object is entering, will enter, or has entered a difficult to distinguish area associated with the perception system or is within a threshold distance to the exterior surface of the vehicle. The perception system may also determine that an impact momentum (e.g., the combined/relative momentum of the vehicle and object) is greater than a first threshold (e.g., the object and/or the vehicle is traveling at a speed that the object may impact the vehicle) and less than a second threshold (e.g., the object and/or vehicle is traveling at a speed that if the object impacts the vehicle, the impact may not be detected by the IMUs of the vehicle). If no potential low momentum impact is likely than the process 300 may return to 302. Otherwise, the process 300 may proceed to 308.

At 308, the vehicle may determine a window of time associated with the potential impact. For example, the vehicle may determine a point in time at which the potential impact may occur based on the vehicle's position, the vehicle's heading, the vehicle's momentum, the object's positions, the object's trajectory, and the object's momentum. The vehicle may then determine a window of time, such as 10, 15, or 30 milliseconds around the point in time. The window of time may correspond to a period in which the potential impact may have occurred. In some case, the window of time may be based on the point in time in which the object passed or crossed the threshold distance to the exterior surface of the vehicle, such as the next 10, 20, or 30 milliseconds.

At 310, the vehicle may analyze microphone data and/or motion data within the window of time. For example, the vehicle may determine if a spike or increase in activity was detected by one or more of the microphones during the window of time. In some cases, the vehicle may search for a spike or increase in activity from microphones or microphones pairs positioned nearest or proximate to a predicted location of impact between the object and vehicle. In other cases, the vehicle may determine if a spike or increase in activity was detected by one or more of the motion sensors (e.g., IMUs, gyroscopes, accelerators, etc.) during the window of time. In still other cases, the vehicle may determine if a spike or increase in activity was detected by both one or more of the microphones and one or more of the motion sensors during the window of time.

In one specific example, the vehicle may apply one or more classifiers trained to analyze the microphone data with respect to detecting an impact. In this example, the spike or increase in activity may be classified into categories, such as various type of environmental noise similar to impacts with the vehicle (e.g., automobile doors slamming), types of impacts (e.g., impacts by a pedestrian, bicyclists, or another vehicle), or other similar types of sounds.

At 312, the vehicle may determine if an impact was detected. For example, if the microphone data illustrates a spike or increase in activity and the classifier determines the increased activity is likely an impact, the vehicle may have detected an impact and should stop normal operations. In some cases, when the microphone data indicates an impact, the vehicle may also collaborate the microphone data using the other sensors. For example, the lidar, radar, and image data may be used to determine if other events in the physical environment proximate to the vehicle may have caused the spike or increase in activity. For instance, image data representing someone exiting a vehicle and shutting the door may cause the microphones to detect a spike in activity similar to a low momentum impact. In this instance, the vehicle may utilize the image data to determine that the spike or increase in activity within the microphone data was unrelated to a potential impact. In some cases, the classifier may also be trained to utilize other types of sensor data when detecting the low momentum impact or collision. For example, the classifiers may be trained on combinations of data from the microphones, IMUs, lidar sensors, radar sensors, and/or image sensors to more accurately detect the low momentum impacts. In these cases, the classifier may use the additional sensor data to collaborate the increase in activity detected by the microphone. If no potential low momentum impact is detected than the process 300 may return to 302. Otherwise, the process 300 may proceed to 314.

In some cases, the vehicle may determine a location or position with respect to the vehicle and associated with the impact. For example, the location or position may be determined based on various localization techniques associated with microphone arrays or using time-based triangulation between the increase in activity between the various microphones positioned about the vehicle. In some examples, models associated determine location of an impact based on vibrations conducted via the chassis, frame, or body of the vehicle (e.g., the models may represent different impact locations and corresponding detections by the microphones). In some cases, the body vibration models may be used in conjunction with similar models associated with air conduction (e.g., sound or noise detection by the microphones). For instance, an impact in rear of the vehicle may detected as both sound and body vibrations by the rear and side microphones but as only body vibrations by the front microphones. In some cases, the location may be further triangulated with respect to the vehicle based on differences in the speed of detection by the microphones as the vibrations may propagate through the body of the vehicle at a faster rate than sound through the air. In other cases, the location may be relative such as a determination of a closest microphone based on an amplitude of the increase in activity (e.g., the nearest microphone experiences the highest amplitude). As a non-limiting example, for an low level impact with the vehicle, a microphone closest to the source of the impact may record audio having an amplitude higher than that of any other microphone on a portion of the vehicle further from the impact, though having a peak(s) which occurs at approximately the same time. In a similar example, a loud sound proximate the vehicle may be differentiated from an impact as, despite having dissimilar amplitudes, the amplitudes may have a measurable difference in time between the amplitudes based on the different media through which the sound is travelling.

At 314, the vehicle may perform an action in response to detecting the impact. For instance, the vehicle may stop and/or contact a remote operator. For example, the vehicle may pull over or stop and alert, notify, or contact a remote operator to assist with the exchange of information with the other party. In some cases, the vehicle may also contact local law enforcement or other first responders as required by governing laws. In some instances, the vehicle may also be configured to access governing laws for the vehicles current location in order to determine the subsequent actions and operations to the detected impact.

Figure 4:
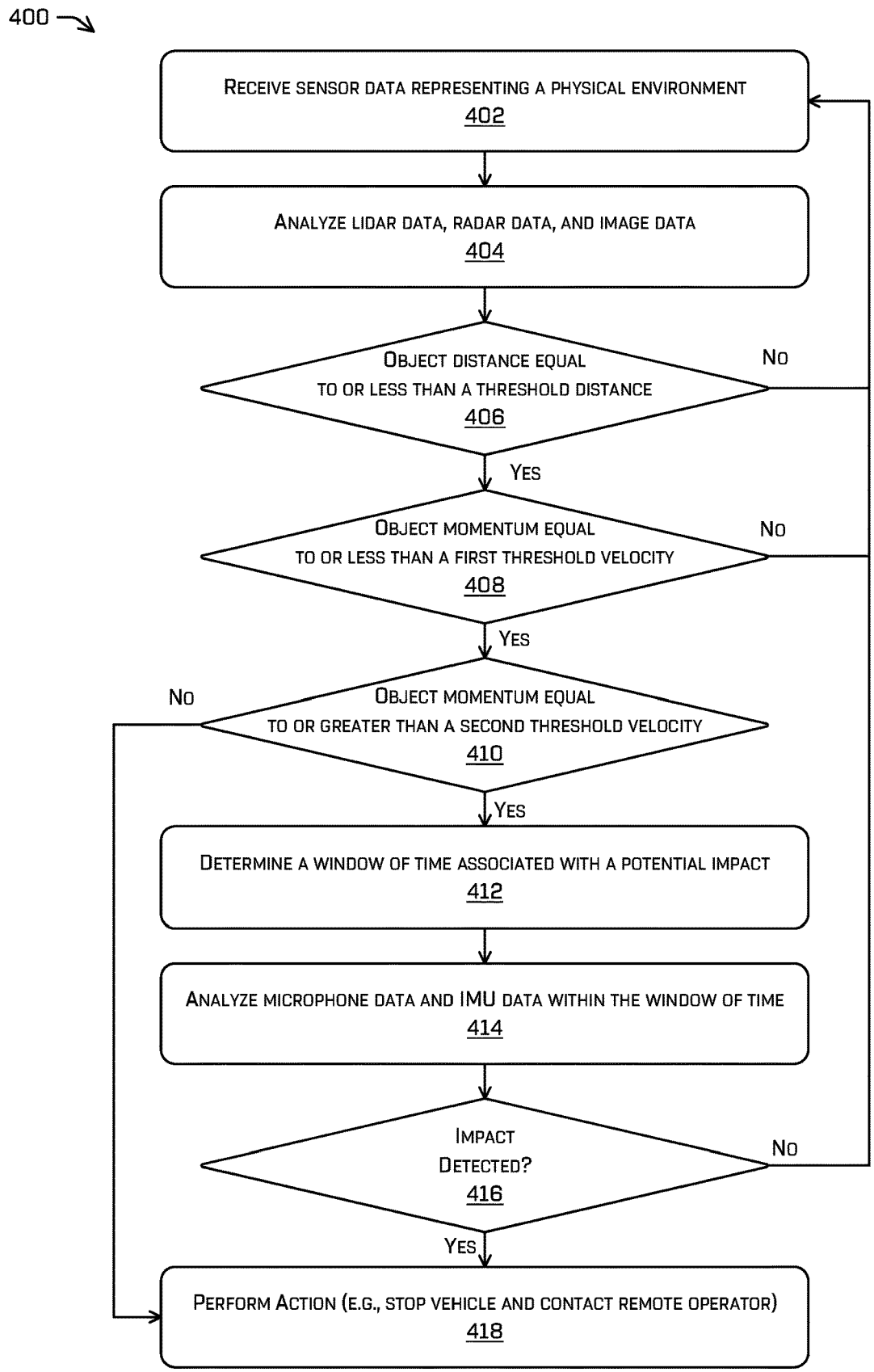
FIG. 4 is another example diagram illustrating an example process for detecting low momentum impacts, as described herein.

FIG. 4 is another example diagram illustrating an example process 300 for detecting low momentum impacts, as described herein. In this example, the autonomous vehicle may utilize the image and motion sensors together with the microphone data to determine if collisions or impacts occurred.

At 402, the vehicle may receive sensor data representing a physical environment. For example, a perception system of the vehicle may receive image data, lidar data, and/or radar data of the physical environment from one or more sensors and, at 404, the perception system may analyze the sensor data. For instance, the perception system may perform classification, segmentation, and/or otherwise process the image data, lidar data, and/or radar data to identify an object, such as the bicyclist of FIG. 1, within the environment surrounding the vehicle. In some cases, the perception system may perform object segmentation, feature extraction, sparse feature representation, pattern detection, white space detection, pixel correlation, feature mapping, etc. and utilize one or more neural networks, deep learning, and/or regression techniques to detect, classify, and predict a motion path of the object. For example, details associated with segmentation and classification are discussed in U.S. application Ser. Nos. 16/779,579 and 16/011,436, which are herein incorporated by reference, in their entirety.

At 406, the perception system may determine if an object distance is equal to or less than a threshold distance. For example, the perception system may determine if the object is entering, will enter, or has entered an area that is difficult for the perception system to distinguish between an impact and a near miss. In some cases, the perception system or other system of the vehicle may track the movement and trajectory of the object as the object nears the vehicle. In other cases, the vehicle may track the momentum, acceleration, and/or velocity of the object relative to the vehicle in determining the threshold distance.

At 408, the vehicle may determine if the momentum (velocity or acceleration) of the object is equal to or less than a first threshold momentum. For example, if the vehicle is moving at a momentum at which the object will stop prior to impacting the vehicle, the vehicle may return to 302. However, if the momentum is greater than the first threshold, the process 300 may advance to 310.

At 410, the vehicle may determine if the momentum (velocity or acceleration) of the object is equal to or greater than a second threshold momentum. For example, if the object is moving at a momentum that an impact is unavoidable, the process 300 may advance to 318 and contact a remote operator. However, if the momentum of the object is less than the second threshold, while an impact is possible, the impact is also avoidable. In this example, the process 300 may proceed to 312.

At 412, the vehicle may determine a window of time associated with a potential impact. For example, the vehicle may determine a point in time at which the potential impact may occur based on the vehicle's position, the vehicle's heading, the vehicle's momentum, the object's positions, the object's trajectory, and the object's momentum. The vehicle may then determine a window of time, such as 10, 15, or 30 milliseconds around the point in time. The window of time may correspond to a period in which the potential impact may have occurred. In some case, the window of time may be based on the point in time in which the object passed or crossed the threshold distance to the exterior surface of the vehicle, such as the next 10, 20, or 30 milliseconds.

At 414, the vehicle may analyze microphone data and/or IMU data within the window of time. For example, the vehicle may determine if a spike or increase in activity was detected by one or more of the microphones during the window of time. In some cases, the vehicle may search for a spike or increase in activity from microphones or microphone pairs positioned nearest or proximate to a predicted location of impact between the object and vehicle. In one specific example, the vehicle may apply one or more classifiers trained to analyze the microphone data with respect to detecting an impact. In this example, the spike or increase in activity may be classified into categories, such as various type of environmental noise similar to impacts with the vehicle (e.g., automobile doors slamming), types of impacts (e.g., impacts by a pedestrian, bicyclists, or another vehicle), or other similar types of sounds.

At 416, the vehicle may determine if an impact was detected. For example, if the microphone data illustrates a spike or increase in activity and the classifier determines the increased activity is likely an impact, the vehicle may have detected an impact and should stop normal operations. In some cases, when the microphone data indicates an impact, the vehicle may also collaborate the microphone data using the other sensors. For example, the lidar, radar, and image data may be used to determine if other events in the physical environment proximate to the vehicle may have caused the spike or increase in activity. For instance, image data representing someone exiting a vehicle and shutting the door may cause the microphones to detect a spike in activity similar to a low momentum impact. In this instance, the vehicle may utilize the image data to determine that the spike or increase in activity within the microphone data was unrelated to an impact or a potential impact. In some cases, the classifier may also be trained to utilize other types of sensor data when detecting the low momentum impact or collision. For example, the classifiers may be trained on combinations of data from the microphones, IMUs, lidar sensors, radar sensors, and/or image sensors to more accurately detect the low momentum impacts. In these cases, the classifier may use the additional sensor data to collaborate the increase in activity detected by the microphone. If no low momentum impact is detected than the process 400 may return to 402. Otherwise, the process 400 may proceed to 418.

At 418, the vehicle may perform an action. For example, the vehicle may stop and/or contact a remote operator. For example, the vehicle may pull over or stop and alert, notify, or contact a remote operator to assist with the exchange of information with the other party. In some cases, the vehicle may also contact local law enforcement or other first responders as required by governing laws. In some instances, the vehicle may also be configured to access governing laws for the vehicles current location in order to determine the subsequent actions and operations to the detected impact. In one specific example, the vehicle may also provide (e.g., output via the microphones and/or a display associated with the vehicle) known vehicle information, such as a vehicle identification number (VIN).

Figure 5:
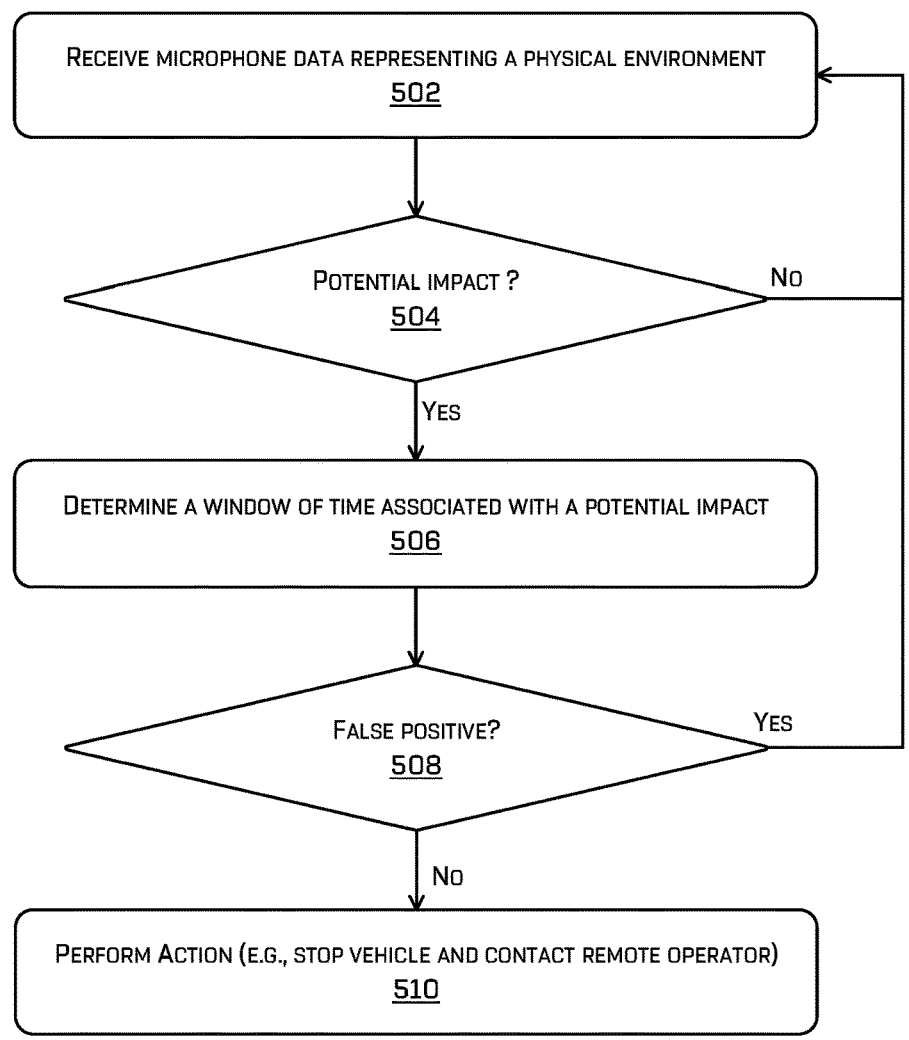
FIG. 5 is another example diagram illustrating an example process for detecting low momentum impacts, as described herein.

FIG. 5 is another example diagram illustrating an example process 500 for detecting low momentum impacts, as described herein. In this example, the vehicle may utilize the microphones to detect potential impacts and then utilize the perception data to rule out any false positives detected.

At 502, the vehicle may receive microphone data representing the physical environment. For example, the microphones may be positioned as pairs around the exterior of the vehicle, such that the vehicle may capture audio data in a 360-degree manner. In some cases, the microphones may be pairs of microphones or microphone arrays to further assist in determining direction of a speaker or noise.

At 504, the vehicle may determine if a potential impact was detected. For example, the vehicle may apply a classifier or other machine learning technique to the microphone data, such that the vehicle may identify spikes or increases in activity as potential impacts.

At 506, the vehicle may determine a window of time associated with the potential impact, as discussed above. In this case, the vehicle may determine a point in time at which the potential impact may occur based on a time, such as a time stamp, associated with the increased activity captured by the microphone. In some cases, the window of time may be expanded to correct for a margin of error associated with the time stamps. For instance, the preceding system may generate a preceding time stamp and a succeeding time stamp to define a window of time about the potential low momentum impact. In this instance, the window may commence 5, 10, 15, or 30 milliseconds earlier than a preceding time stamp and 5, 10, 15, or 30 milliseconds after a succeeding time stamp.

At 508, the vehicle may determine if a false positive was detected based on the additional sensor data. For example, the vehicle may analyze other types of sensor data, such as lidar data, radar data, image data, and IMU data, proximity sensor data. For instance, in some cases, when the microphone data indicates an impact, the vehicle may collaborate the microphone data using the other sensors. For example, the lidar, radar, and image data may be used to determine if other events in the physical environment proximate to the vehicle may have caused the spike or increase in activity. As an example, image data representing someone exiting a vehicle and shutting the door may cause the microphones to detect a spike in activity similar to a low momentum impact and may be discarded. In this instance, the vehicle may utilize the image data to determine that the spike or increase in activity within the microphone data was unrelated to a potential impact. In some implementations, the classifier may also be trained to utilize the other types of sensor data when detecting the low momentum impact or collision. For example, the classifiers may be trained on combinations of data from the microphones, IMUs, lidar sensors, radar sensors, and/or image sensors to more accurately detect the low momentum impacts. In these cases, the classifier may use the additional sensor data to collaborate the increase in activity detected by the microphone. If a false positive was detected, the process 500 may return to 502, otherwise the process 500 may proceed to 512. If no potential low momentum impact is detected than the process 500 may return to 502. Otherwise, the process 500 may proceed to 512.

Figure 6:
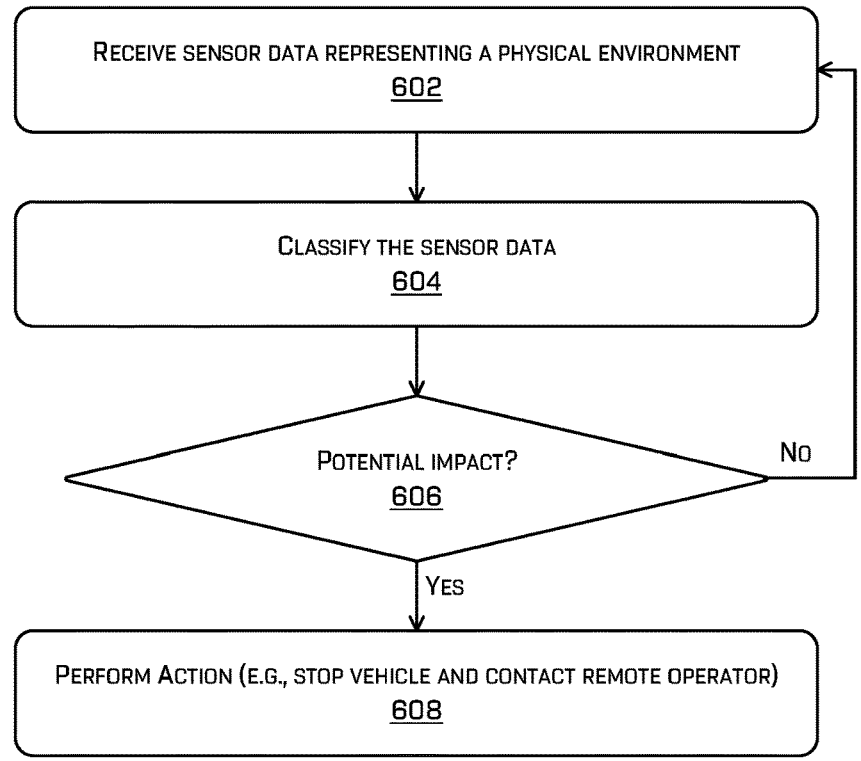
FIG. 6 is another example diagram illustrating an example process for detecting low momentum impacts, as described herein.

At 510, the vehicle may perform an action. For example, the vehicle may stop and/or contact a remote operator. For example, the vehicle may pull over or stop and alert, notify, or contact a remote operator to assist with the exchange of information with the other party. In some cases, the vehicle may also contact local law enforcement or other first responders as required by governing laws. In some instances, the vehicle may also be configured to access governing laws for the vehicles current location in order to determine the subsequent actions and operations to the detected impact. FIG. 6 is another example diagram illustrating an example process for detecting low momentum impacts, as described herein. In some examples, the vehicle may utilize the microhome data in addition to other types of sensor data including the IMU data, lidar data, radar data, and image data to determine if a low momentum impact occurred. For example, the vehicle may utilize a classifier trained with the combination of data or various probability functions to determine if the low momentum impact occurred.

FIG. 6 is another example diagram illustrating an example process 600 for detecting low velocity impacts, as described herein. In some examples, the vehicle may utilize the microhome data in addition to other types of sensor data including the IMU data, lidar data, radar data, and image data to determine if a low velocity impact occurred. For example, the vehicle may utilize a classifier trained with the combination of data or various probability functions to determine if the low velocity impact occurred.

At 602, the vehicle may receive sensor data representing a physical environment. The sensor data may include image data, lidar data, radar data, IMU or motion data, and/or microphone data captured from the physical environment. In some cases, the various types of data may be time stamped using either or both a local clock and a global (e.g., vehicle wide) clock. In this manner, the sensor data may be analyzed contemporaneously with each other. In some specific examples, the sensor data may include the microphone data together with airbag trigger IMU data, and seatbelt lock or control IMU data.

At 604, the vehicle may classify the sensor data. For example, the vehicle may perform object segmentation, feature extraction, sparse features representation, pattern detection, white space detection, feature mapping, etc. and utilize one or more neural networks, deep learning, and/or regression techniques to detect, classify, and track objects and events represented by the sensor data. For example, details of object tracking and prediction are discussed in U.S. application Ser. Nos. 16/779,576 and 16/235,862, which are herein incorporated by reference, in their entirety.

At 606, if the classifier detects a potential impact, the process 600 may advance to 608. Otherwise, the process 600 may return to 602. In some cases, the vehicle may use a structured data collection for an impact using a particular momentum (velocity or acceleration) and train the model or network based on the microphone outputs as they correspond to the particular momentum-based impacts, location or relative position of impacts, a vicinity of the impact, among others. The models and networks associated with the classification of the impact may, in some cases, be trained using actual impact data, including perception data, IMU data, and audio or microphone data.

At 608, the vehicle may perform an action, such as stopping and/or contacting a remote operator. For example, the vehicle may pull over or stop and alert, notify, or contact a remote operator to assist with the exchange of information with the other party. In some cases, the vehicle may also contact local law enforcement or other first responders as required by governing laws. In some instances, the vehicle may also be configured to access governing laws for the vehicles current location in order to determine the subsequent actions and operations to the detected impact.

Figure 7:
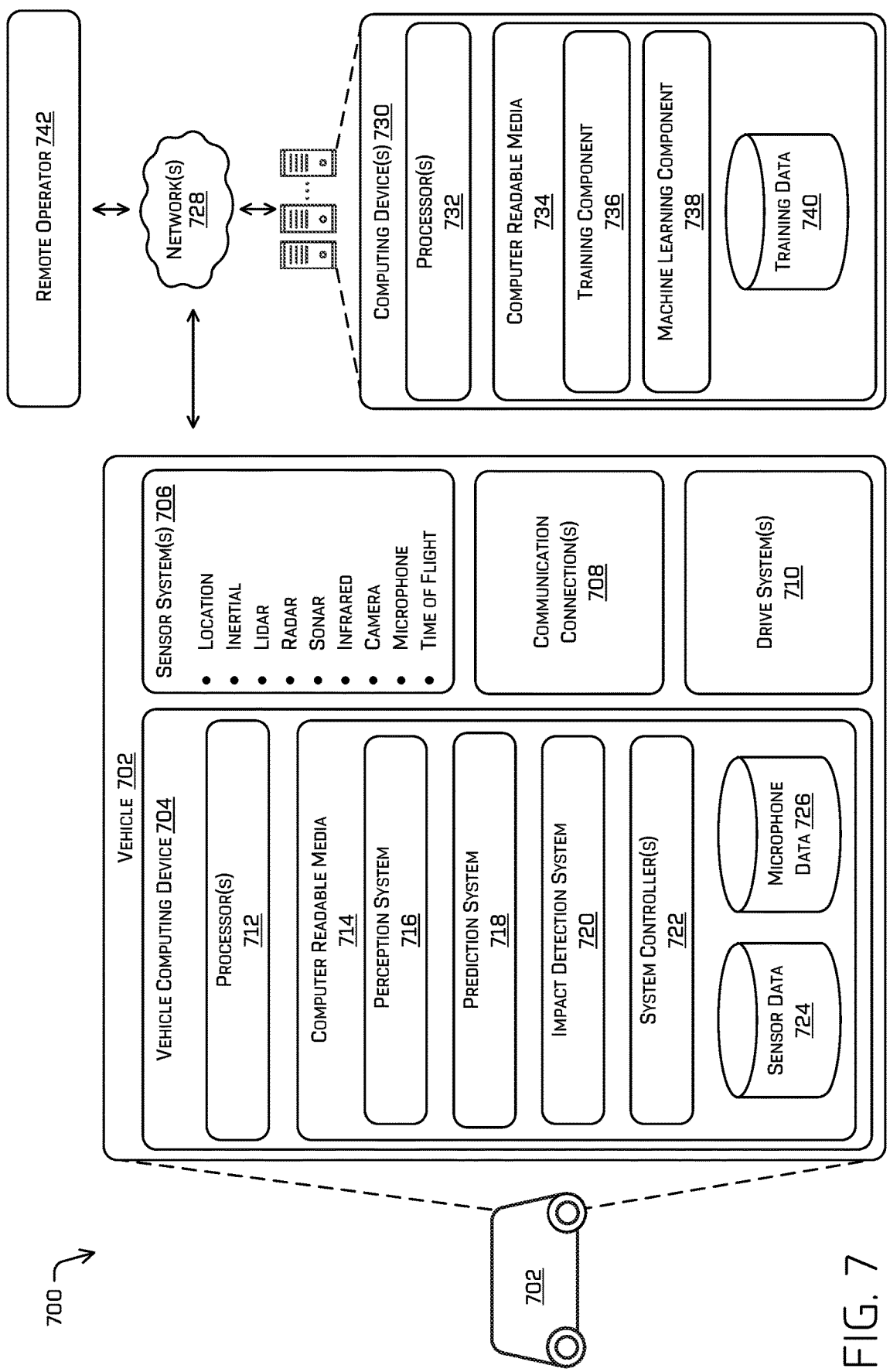
FIG. 7 is a block diagram of an example system for implementing the techniques described herein, in accordance with embodiments of the disclosure.

FIG. 7 is a block diagram of an example system 700 for implementing the techniques described herein, in accordance with embodiments of the disclosure. In some examples, the system 700 may include one or multiple features, components, and/or functionality of embodiments described herein with reference to FIGS. 1-6. In some embodiments, the system 700 may include a vehicle 702. The vehicle 702 may include a vehicle computing device 704, one or more sensor systems 706, one or more communication connections 708, and one or more drive systems 710.

The vehicle computing device 704 may include one or more processors 712 and computer readable media 714 communicatively coupled with the one or more processors 712. In the illustrated example, the vehicle 702 is an autonomous vehicle; however, the vehicle 702 could be any other type of vehicle, or any other system (e.g., a robotic system, a camera enabled smartphone, etc.). In the illustrated example, the computer readable media 714 of the vehicle computing device 704 stores a perception system 716, a prediction system 718, an impact detection system 720, one or more system controllers 722 as well as sensor data 724 and other data. Though depicted in FIG. 7 as residing in computer readable media 714 for illustrative purposes, it is contemplated that the perception system 716, the prediction system 718, the one or more system controllers 722 as well as the sensor data 724, microphone data 726, and the other data, may additionally, or alternatively, be accessible to the vehicle 702 (e.g., stored on, or otherwise accessible by, computer readable media remote from the vehicle 702).

In at least one example, the perception system 716 may be configured to receive lidar data, radar, data, and image data captured during normal operations of the vehicle by the sensor system 706. The perception system 716 may implement object detection, object classification, and object tracking update pipelines. As discussed above with respect to FIGS. 1-6, the perception system 716 may determine if an object is entering a distance threshold or area of reduced perception sensor visibility.

The prediction system 718 may be configured to estimate current, and/or predict future, characteristics or states of objects, such as pose, speed, trajectory, momentum, yaw, yaw rate, roll, roll rate, pitch, pitch rate, position, acceleration, or other characteristics, based at least in part on the output of the perception system 716. For instance, the prediction system 718 may determine if an object entering the distance threshold has the potential to cause a low momentum impact with the vehicle 702.

The impact detection system 720 may be configured to analyze or process the microphone data 726 to determine if a low momentum impact occurred and, in some cases, to utilize the other sensor data 724 to either identify false positives and/or more accurately classify the microphone data as a low momentum impact. For example, the impact detection system 720 may determine a window of time in which the potential low momentum impact is possible based on the output of the prediction system 718 and/or the perception system 716. The impact detection system 720 may then analyze the microphone data 726 within the window of time to determine if a spike or increase in activity is present. As discussed above, the increase in activity may represent a low momentum impact.

In some cases, the impact detection system 720 may implement a neural network or machine learned classifier that may be able to classify the increased activity detected by the microphones. If the impact detection system 720 determines the increased activity is likely an impact, the vehicle may have detected an impact and should stop normal operations. In some cases, when the microphone data indicates an impact, the impact detection system 720 may also collaborate the microphone data using the other sensor data 724. For example, lidar, radar, and image data may be used to determine if other events in the physical environment proximate to the vehicle 702 may have caused the spike or increase in activity. In some cases, the classifier may also be trained to utilize other types of sensor data 724 when detecting the low momentum impact or collision. For example, the classes may include a location or position of an impact, a momentum associated with the impact, a class of damage associated with the impact, a type of object causing the impact, among others.

In at least one example, the vehicle computing device 704 can include one or more system controllers 722, which can be configured to control steering, propulsion, braking, safety, emitters, communication, and other systems of the vehicle 702. These system controller(s) 722 may communicate with and/or control corresponding systems of the drive system(s) 710 and/or other components of the vehicle 702.

In some instances, aspects of some or all of the components discussed herein can include any models, algorithms, and/or machine learning algorithms. For example, in some instances, components in the computer readable media 714 (and the computer readable media 734, discussed below) such as the out of sequence perception system 716, the prediction system 718, and/or impact detection system 720, and may be implemented as a neural network. For instance, the out of sequence perception system 716 may comprise a machine learned model (e.g., neural network) which has been trained to predict speed, trajectory, and/or other characteristics of a pedestrian (or other object) based on image data.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 706 can include multiple instances of each of these or other types of sensors. For instance, the lidar sensors may include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 may provide input to the vehicle computing device 704. Additionally, or alternatively, the sensor system(s) 706 can send sensor data, via the one or more networks 728, to the one or more computing device(s) at a particular frequency, after a lapse of a predetermined period of time, in near real-time, etc.

The vehicle 702 can also include one or more communication connection(s) 708 that enable communication between the vehicle 702 and one or more other local or remote computing device(s). For instance, the communication connection(s) 708 may facilitate communication with other local computing device(s) on the vehicle 702 and/or the drive system(s) 710. Also, the communication connection(s) 708 may allow the vehicle 702 to communicate with other nearby computing device(s) (e.g., other nearby vehicles, traffic signals, etc.). The communications connection(s) 708 also enable the vehicle 702 to communicate with remote teleoperations computing device or other remote services.

The communications connection(s) 708 may include physical and/or logical interfaces for connecting the vehicle computing device 704 to another computing device (e.g., computing device(s) 730) and/or a network, such as network(s) 728. For example, the communications connection(s) 708 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 710. In some examples, the vehicle 702 may have a single drive system 710. In at least one example, if the vehicle 702 has multiple drive systems 710, individual drive systems 710 can be positioned on opposite ends of the vehicle 702 (e.g., the front and the rear, etc.). In at least one example, the drive system(s) 710 can include one or more sensor systems 706 to detect conditions of the drive system(s) 710 and/or the surroundings of the vehicle 702, as discussed above. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 710. In some cases, the sensor system(s) 706 on the drive system(s) 710 can overlap or supplement corresponding systems of the vehicle 702.

In at least one example, the components discussed herein can process sensor data 724, as described above, and may send their respective outputs, over the one or more network(s) 728, to one or more computing device(s) 730. In at least one example, the components discussed herein may send their respective outputs to the one or more computing device(s) 730 at a particular frequency, after a lapse of a predetermined period of time, in near real-time, etc.

In some examples, the vehicle 702 can send sensor data to one or more computing device(s) 730 via the network(s) 728. In some examples, the vehicle 702 can send raw sensor data 724 to the computing device(s) 730. In other examples, the vehicle 702 can send processed sensor data 724 and/or representations of sensor data (for instance, the object perception tracks) to the computing device(s) 730. In some examples, the vehicle 702 can send sensor data 724 to the computing device(s) 730 at a particular frequency, after a lapse of a predetermined period of time, in near real-time, etc. In some cases, the vehicle 702 can send sensor data (raw or processed) to the computing device(s) 730 as one or more log files.

The computing device(s) 730 may include processor(s) 732 and computer readable media 734 storing a training component 736, a machine learning component 738, as well as training data 740. The training component 736 may generate the training data 740 using the sensor data 724 and the microphone data 726 received from one or more vehicles 702. For instance, the training component 736 may label data representative of events with one or more measured parameters or characteristics. The training component 736 may then use the training data 740 to train the machine learning component 738 to generate models for the impact detection system 720 to predict low momentum impacts, as discussed above.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 712 of the vehicle 702 and the processor(s) 732 of the computing device(s) 730 may be any suitable processor capable of executing instructions to process data and perform operations as described herein. By way of example and not limitation, the processor(s) 712 and 732 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 714 and 734 are examples of non-transitory computer-readable media. The computer readable media 714 and 734 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 7 is illustrated as a distributed system, in alternative examples, components of the vehicle 702 can be associated with the computing device(s) 730 and/or components of the computing device(s) 730 can be associated with the vehicle 702. That is, the vehicle 702 can perform one or more of the functions associated with the computing device(s) 730, and vice versa. Further, aspects of machine learning component 738 can be performed on any of the devices discussed herein.

In some examples, the vehicle 702 may also be communicatively coupled via the network 728 to one or more remote operators 742. The remote operators 742 may be configure to or able to assume operational control of the vehicle 702. For instance, the remote operators 742 may be able to steer or drive the vehicle 702 via a remote interface. In some cases, the vehicle 702 may alert or otherwise notify the remote operator 742 in response to detecting an impact event or a potential impact event.

EXAMPLE CLAUSES

A. An autonomous vehicle comprising: one or more processors; and one or more non-transitory computer readable media storing instructions executable by the one or more processors, wherein the instructions, when executed, cause the autonomous vehicle to perform operations comprising: receiving perception data from a sensor; receiving first audio data from a first microphone positioned along at least one exterior surface of the autonomous vehicle; determining, based at least in part on the perception data, that an object is likely to impact the autonomous vehicle; detecting, based at least in part on a portion of the first audio data, an impact with the object; and causing the autonomous vehicle to perform an action based at least in part on the impact with the object.

B. The autonomous vehicle of claim A, wherein the action comprises at least one of contacting a remote operator, contacting a first responder, causing the autonomous vehicle to halt operations, or updating a route associated with the autonomous vehicle, or a first responder in response to detecting the impact with the object.

C. The autonomous vehicle of claim A, further comprising determining, based at least in part on the perception data, a window of time associated with a potential impact and wherein the portion of the first audio data is associated with the window of time.

D. The autonomous vehicle of claim A, wherein the operations further comprise: receiving second audio data from a second microphone; and determining a relative location of the impact in relation to the autonomous vehicle based at least in part on a first amplitude associated with the first audio data and a second amplitude associated with the second audio data.

E. A method comprising: receiving sensor data from a sensor of a vehicle; receiving first audio data from a first microphone of the vehicle; detecting, based at least in part on the sensor data, an object in an environment proximate the vehicle; determining a period of time associated with a potential impact of the object with the vehicle; detecting an increase in activity associated with the first audio data during the period of time; and causing the vehicle to perform an action based at least in part on detecting the increase in activity during the period of time.

F. The method of paragraph E, wherein determining the period of time comprises: determining, based at least in part on the sensor data, at least one of a momentum of the object or a momentum of the vehicle is greater than or equal to a momentum threshold; and the period of time is based at least in part on the momentum of the object and a time stamp associated with the sensor data.

G. The method of paragraph E, further comprise: receiving second audio data from a second microphone; and determining a relative location of an impact in relation to the vehicle based at least in part on a first amplitude associated with the first audio data and a second amplitude associated with the second audio data.

H. The method of paragraph E, further comprising: inputting the audio data into a machine learned model trained to detect impact events; and receiving, from the machine learned model, an indication that the first audio data is associated with a likelihood of an impact event; and wherein causing the vehicle to perform the action is based at least in part on the likelihood of the impact event.

I. The method of paragraph H, further comprising receiving additional sensor data and wherein: the additional sensor data comprises one or more of image data, lidar data, or radar data and at least one of accelerometer data, magnetometer data, or gyroscope data, determining the increase in activity associated with the first audio data is an impact event based at least in part on the at least one of the accelerometer data, the magnetometer data, or the gyroscope data.

J. The method of paragraph E, wherein determining the period of time in which an object may impact the vehicle further comprises: determining a likelihood of an impact based on a one or more of a predicted trajectory of the object or an intended path of the vehicle; and determining one or more times at which the likelihood of the impact is equal to or greater than a threshold likelihood, wherein the period of time comprises the one or more times at which the likelihood of the impact is equal to or greater than the threshold likelihood.

K. The method of paragraph E, further comprising: inputting the first audio data into to a machine learned model trained to determine a likelihood of an impact; and determining the likelihood of the impact is equal to or greater than a threshold likelihood.

L. The method of paragraph E, further comprising: inputting the first audio data, inertial measurement unit data, lidar data, image data, or radar data into to a machine learned model trained to determine a likelihood of an impact; and determining the likelihood of the impact is equal to or greater than a threshold likelihood.

M. The method of paragraph E, wherein detecting the increase in activity comprises classifying the increase in activity as originating from an additional source other than the object, and wherein causing the vehicle to perform the action comprises causing the vehicle to navigate through an environment based at least in part on the additional source.

N. The method of paragraph E, wherein the action comprises at least one of causing the vehicle to perform a maneuver, update a route, or sending a signal to a remote user.

O. A non-transitory computer-readable medium storing instructions that, when executed, cause one or more processors to perform operations comprising: receiving sensor data from one or more sensors of a system; receiving first audio data from one or more first audio sensors of the system; determining, based at least in part on the sensor data, that an object may impact the system; detecting, in response to determining that the object may impact the system, an increase in activity associated with the first audio data; and causing the system to cease normal operations in response to detecting the increase in activity.

P. The non-transitory computer-readable medium of paragraph O, wherein the operations further comprise: detecting, based at least in part on the sensor data, an alternative source for the increase in activity assorted with the first audio data; and causing the system to resume the normal operations in response to detecting the alternative source.

Q. The non-transitory computer-readable medium of paragraph O, wherein determining that the object may impact the system further comprises: receiving second audio data from a second audio sensor; and determining a relative location of the impact based at least in part on a first amplitude associated with the first audio data and a second amplitude associated with the second audio data.

R. The non-transitory computer-readable medium of paragraph O, wherein determining that the object may impact the system further comprises: inputting the first audio data into to a machine learned model; receiving an indication of a class from the model; and wherein causing the system to cease normal operations is in response to increase in activity associated with the first audio data being classified as an impact event.

S. The non-transitory computer-readable medium of paragraph O, wherein determining that the object may impact the system further comprises: determining, based at least in part on the sensor data, a period of time associated with the impact and wherein detecting the increase in activity associated with the first audio data is during the period of time.

T. The non-transitory computer-readable medium of paragraph O, wherein the operations further comprise contacting a remote user.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 6 may utilize the processes and flows of FIGS. 1-5.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. An autonomous vehicle comprising:
one or more processors; and
one or more non-transitory computer readable media storing instructions executable by the one or more processors, wherein the instructions, when executed, cause the autonomous vehicle to perform operations comprising:
receiving perception data from a sensor;
receiving first audio data from a first microphone positioned along at least one exterior surface of the autonomous vehicle;
determining, based at least in part on the perception data, that an object is likely to impact the autonomous vehicle, wherein the impact with the autonomous vehicle is less than a threshold that would register as an impact by the first microphone;
determining a period of time comprising a continuous window from before a point of time during when the object is likely to impact the autonomous vehicle to after the point of time during when the object is likely to impact the autonomous vehicle;
determining, based at least in part on a portion of the first audio data, that the impact with the object occurred during the period of time; and
causing the autonomous vehicle to perform an action based at least in part on the impact with the object.

2. The autonomous vehicle of claim 1, wherein the action comprises at least one of contacting a remote operator, contacting a first responder, causing the autonomous vehicle to halt operations, or updating a route associated with the autonomous vehicle, or a first responder in response to detecting the impact with the object.

3. The autonomous vehicle of claim 1, wherein the operations further comprise:
receiving second audio data from a second microphone; and
determining a relative location of the impact in relation to the autonomous vehicle based at least in part on a first amplitude associated with the first audio data and a second amplitude associated with the second audio data.

4. The autonomous vehicle of claim 1, wherein the threshold is a first threshold; and
determining, based at least in part on a portion of the first audio data, the impact with the object during the period of time comprises:
determining that the portion of the first audio data meets a second threshold that is less than the first threshold; and
in response to determining that the portion of the first audio data meets the second threshold, determining that the impact with the object occurred during the period of time.

5. A method comprising:
receiving sensor data from a sensor of a vehicle;
receiving first audio data from a first microphone of the vehicle, the first microphone positioned along an exterior surface of the vehicle;
detecting, based at least in part on the sensor data, an object in an environment proximate the vehicle, wherein the object contacting the vehicle generates a signal less than a threshold amount to register as an impact by an impact sensor associated with the vehicle;
determining a period of time associated with a potential impact of the object with the vehicle, wherein the period of time comprises a continuous window from before a point of time during when the potential impact is likely to occur to after the point of time during when the potential impact is likely to occur;
detecting an increase in activity associated with the first audio data during the period of time; and
causing the vehicle to perform an action based at least in part on detecting the increase in activity during the period of time.

6. The method of claim 5, wherein determining the period of time comprises:
determining, based at least in part on the sensor data, at least one of a velocity momentum of the object or a velocity a momentum of the vehicle is greater than or equal to a velocity momentum threshold; and
the period of time is based at least in part on the momentum of the object and a time stamp associated with the sensor data.

7. The method of claim 5, further comprising comprise:
receiving second audio data from a second microphone; and
determining a relative location of an impact in relation to the vehicle based at least in part on a first amplitude associated with the first audio data and a second amplitude associated with the second audio data.

8. The method of claim 5, further comprising:
inputting the first audio data into a machine learned model trained to detect impact events; and
receiving, from the machine learned model, an indication that the first audio data is associated with a likelihood of an impact event; and
wherein causing the vehicle to perform the action is based at least in part on the likelihood of the impact event.

9. The method of claim 8, further comprising receiving additional sensor data and wherein:
the additional sensor data comprises one or more of image data, lidar data, or radar data and at least one of accelerometer data, magnetometer data, or gyroscope data, and
determining the increase in activity associated with the first audio data is an impact event based at least in part on the at least one of the accelerometer data, the magnetometer data, or the gyroscope data.

10. The method of claim 5, wherein determining the period of time in which an object may impact the vehicle further comprises:
determining a likelihood of an impact based on a one or more of a predicted trajectory of the object or an intended path of the vehicle; and
determining one or more times at which the likelihood of the impact is equal to or greater than a threshold likelihood,
wherein the period of time comprises the one or more times at which the likelihood of the impact is equal to or greater than the threshold likelihood.

11. The method of claim 5, further comprising:
inputting the first audio data into to a machine learned model trained to determine a likelihood of an impact; and
determining the likelihood of the impact is equal to or greater than a threshold likelihood.

12. The method of claim 5, further comprising:
inputting the first audio data, inertial measurement unit data, lidar data, image data, or radar data into to a machine learned model trained to determine a likelihood of an impact; and
determining the likelihood of the impact is equal to or greater than a threshold likelihood.

13. The method of claim 5,
wherein detecting the increase in activity comprises classifying the increase in activity as originating from an additional source other than the object, and
wherein causing the vehicle to perform the action comprises causing the vehicle to navigate through an environment based at least in part on the additional source.

14. The method of claim 5, wherein the impact sensor is the first microphone and the threshold is a first threshold; and
the causing the vehicle to perform the action is based at least in part on detecting that the increase in activity during the time period meets a second threshold that is less than the first threshold.

15. The method of claim 5, wherein the period of time associated with the potential impact of the object with the vehicle is determined based at least in part on the sensor data.

16. A non-transitory computer-readable medium storing instructions that, when executed, cause one or more processors to perform operations comprising:
receiving perception sensor data from one or more perception sensors of a system;
receiving first audio data from one or more first audio sensors of the system;
determining, based at least in part on the perception sensor data, a likelihood of an object impacting the system at a velocity that does not register in impact data captured by an impact sensor of the system;
responsive to determining, based at least in part on the perception sensor data, the likelihood of the object impacting the system at the velocity that does not register in the impact data, detecting an increase in activity associated with the first audio data; and
causing the system to cease at least one operation in response to detecting the increase in activity.

17. The non-transitory computer-readable medium of claim 16, wherein the operations further comprise:
detecting, based at least in part on the perception sensor data, an alternative source for the increase in activity assorted with the first audio data; and
causing the system to resume normal operations in response to detecting the alternative source.

18. The non-transitory computer-readable medium of claim 16, wherein determining that the object may impact the system further comprises:
receiving second audio data from a second audio sensor; and
determining a relative location of the impact based at least in part on a first amplitude associated with the first audio data and a second amplitude associated with the second audio data.

19. The non-transitory computer-readable medium of claim 16, wherein determining that the object may impact the system further comprises:
inputting the first audio data into to a machine learned model;
receiving an indication of a class from the model; and
wherein causing the system to cease normal operations is in response to the increase in activity associated with the first audio data being classified as an impact event.

20. The non-transitory computer-readable medium of claim 16, wherein determining that the object may impact the system further comprises:
determining, based at least in part on the perception sensor data, a period of time associated with the impact and wherein detecting the increase in activity associated with the first audio data is during the period of time.

* * * * *